(12) United States Patent
Al-Qarni et al.

(10) Patent No.: US 12,110,786 B1
(45) Date of Patent: Oct. 8, 2024

(54) BATTERY-OPERATED POSITION SENSOR ASSEMBLY FOR WELLBORE INTERVENTION

(71) Applicant: SAUDI ARABIAN OIL COMPANY, Dhahran (SA)

(72) Inventors: Hassan S. Al-Qarni, Dammam (SA); Mohammed H. Madan, Al-Qatif (SA); Jawad Zahur, Abqaiq (SA); Saud A. Al-Shuwaier, Al Khobar (SA)

(73) Assignee: SAUDI ARABIAN OIL COMPANY, Dhahran (SA)

( * ) Notice: Subject to any disclaimer, the term of this patent is extended or adjusted under 35 U.S.C. 154(b) by 0 days.

(21) Appl. No.: 18/357,016

(22) Filed: Jul. 21, 2023

(51) Int. Cl.
| | |
|---|---|
| *E21B 47/09* | (2012.01) |
| *E21B 47/017* | (2012.01) |
| *E21B 47/024* | (2006.01) |
| *E21B 47/06* | (2012.01) |
| *G01V 11/00* | (2006.01) |

(52) U.S. Cl.
CPC ............ *E21B 47/09* (2013.01); *E21B 47/017* (2020.05); *E21B 47/024* (2013.01); *E21B 47/06* (2013.01); *G01V 11/005* (2013.01)

(58) Field of Classification Search
CPC ...... E21B 47/024; E21B 47/09; E21B 47/017; E21B 47/06; G01V 11/005
See application file for complete search history.

(56) References Cited

U.S. PATENT DOCUMENTS

| | | | | |
|---|---|---|---|---|
| 4,537,067 | A | * | 8/1985 | Sharp .................... E21B 47/022 73/152.13 |
| 2004/0222019 | A1 | * | 11/2004 | Estes .................... E21B 47/026 175/45 |

(Continued)

OTHER PUBLICATIONS

Rodriguez Rosas, R. et al., "Acquisition of Directional Survey Data with Adapted Logging Tools"; Proceedings of the SPE International Petroleum Conference and Exhibition in Mexico; Paper No. SPE-74398-MS; pp. 1-12; Feb. 10, 2022 (12 pages).

(Continued)

*Primary Examiner* — Shane Bomar
(74) *Attorney, Agent, or Firm* — Osha Bergman Watanabe & Burton LLP

(57) ABSTRACT

A sensor assembly includes a position measurement sensor, a slickline, and a processor. The position measurement system measures angular velocity of the sensor assembly inside a wellbore that extends in an axial direction. The slickline raises and lowers the position measurement sensor in the wellbore. The processor executes a series of measurement units including: an inclination measurement unit, a coordinate measurement unit, a depth measurement unit, and a data storage unit. The inclination measurement unit determines an inclination of the position measurement sensor. The coordinate measurement unit determines radial coordinates of the position measurement sensor. The depth measurement unit determines a real-time depth level of the position measurement sensor. Each of the inclination, the radial coordinates, and the real-time depth level are deter- (Continued)

mined from the angular velocity. The data storage unit stores the measured values, including the angular velocity, inclination, radial coordinates, and real-time depth level.

20 Claims, 5 Drawing Sheets

(56) References Cited

U.S. PATENT DOCUMENTS

| | | | |
|---|---|---|---|
| 2009/0050370 A1* | 2/2009 | Peters | E21B 7/06 |
| | | | 175/45 |
| 2014/0304016 A1* | 10/2014 | Bynum | G06Q 50/02 |
| | | | 705/7.12 |
| 2016/0298392 A1* | 10/2016 | Gajji | E21B 3/022 |
| 2018/0038218 A1* | 2/2018 | Hay | E21B 44/00 |
| 2020/0011751 A1* | 1/2020 | Kazemi Miraki | E21B 47/007 |
| 2023/0235659 A1* | 7/2023 | Tackmann | G01V 3/18 |
| | | | 73/152.54 |
| 2024/0084694 A1* | 3/2024 | Hered | E21B 47/0025 |
| 2024/0138264 A1* | 4/2024 | Chen | F03G 4/00 |

OTHER PUBLICATIONS

Estes, R. A. et al., "Development of a Robust Gyroscopic Orientation Tool for MWD Operations"; Proceedings of the SPE Annual Technical Conference and Exhibition; Paper No. SPE-63274-MS; pp. 1-13; Oct. 1, 2000 (13 pages).

\* cited by examiner

BATTERY-OPERATED POSITION SENSOR ASSEMBLY FOR WELLBORE INTERVENTION

BACKGROUND

In the oil and gas industry, slickline refers to a cable used for raising and lowering a variety of tools into a wellbore, e.g., during well intervention operations or other wellsite operations. The tools on the slickline allow for gauges and sensors to be attached in order to obtain downhole measurements of the wellbore operating conditions including, but not limited to, pressure, temperature, depth, inclination, and nuclear magnetic resonance. Taking measurements on the slickline tools can cause inaccuracy on the data due to tension in the slickline cable and relying on predetermined depth levels to perform measurements.

Acquiring precise downhole surveying and logging measurements can prove to be a challenging and costly endeavor. The process of taking measurements between the predetermined depth levels typically requires interpolation, which can lead to inaccurate results if the inputs are imprecise. Furthermore, the interpolation process for determining the depth of the slickline may not capture radial movements of the slickline in the wellbore, which can occur if the slickline starts drifting or becomes embedded in a sidewall of the wellbore.

SUMMARY

In general, in an aspect of one or more embodiments, a sensor assembly includes a position measurement sensor, a slickline, and a processor. The position measurement system measures angular velocity of the sensor assembly inside a wellbore that extends in an axial direction. The slickline raises and lowers the position measurement sensor in the wellbore. The processor executes a series of measurement units including: an inclination measurement unit, a coordinate measurement unit, a depth measurement unit, and a data storage unit. The inclination measurement unit determines an inclination of the position measurement sensor. The coordinate measurement unit determines radial coordinates of the position measurement sensor. The depth measurement unit determines a real-time depth level of the position measurement sensor. Each of the inclination, the radial coordinates, and the real-time depth level are determined from the angular velocity. The data storage unit stores the measured values, including the angular velocity, inclination, radial coordinates, and real-time depth level.

In general, in an aspect of one or more embodiments, a method to perform a plurality of measurements in a wellbore includes measuring an angular velocity of a sensor assembly extending inside a wellbore in an axial direction. The method further includes raising and lowering a slickline with a position measurement sensor attached. In addition, the method includes executing a series of measurement units with a processor. An inclination unit of the measurement units determines an inclination of the position measurement sensor from the angular velocity. A coordinate measurement unit determines radial coordinates from the angular velocity. A depth measurement unit determines a real-time depth level from the angular velocity. Finally, the method includes storing the angular velocity, inclination, radial coordinates, and real-time depth level with a data storage unit.

BRIEF DESCRIPTION OF DRAWINGS

Specific embodiments of the disclosed technology will now be described in detail with reference to the accompanying figures. Like elements in the various figures are denoted by like reference numerals for consistency. The sizes and relative positions of elements in the drawings are not necessarily drawn to scale. For example, the shapes of various elements and angles are not necessarily drawn to scale, and some of these elements may be arbitrarily enlarged and positioned to improve drawing legibility.

DETAILED DESCRIPTION

Specific embodiments of the disclosure will now be described in detail with reference to the accompanying figures. In the following detailed description of embodiments of the disclosure, numerous specific details are set forth in order to provide a more thorough understanding of the disclosure. However, it will be apparent to one of ordinary skill in the art that the disclosure may be practiced without these specific details. In other instances, well known features have not been described in detail to avoid unnecessarily complicating the description.

Throughout the application, ordinal numbers (e.g., first, second, third, etc.) may be used as an adjective for an element (i.e., any noun in the application). The use of ordinal numbers is not intended to imply or create any particular ordering of the elements nor to limit any element to being only a single element unless expressly disclosed, such as using the terms "before", "after", "single", and other such terminology. Rather, the use of ordinal numbers is to distinguish between the elements. By way of an example, a first element is distinct from a second element, and the first element may encompass more than one element and succeed (or precede) the second element in an ordering of elements.

In addition, throughout the application, the terms "upper" and "lower" may be used to describe the position of an element in a wellbore as described herein. In this respect, the term "upper" denotes an element disposed closer to the surface of the Earth than a corresponding "lower" element when the sensor assembly is in the wellbore, while the term "lower" conversely describes an element disposed further from the surface of the Earth than a corresponding "upper" element. Similarly, the term "downhole" may be used when referring to any position inside the wellbore beneath the surface. Likewise, the term "axial" refers to an orientation substantially parallel to an extension direction of a wellbore, while the term "radial" denotes a direction orthogonal to an axial direction. Similarly, the terms "vertical" and "vertically" refer to an axial direction (i.e., the primary extension direction of the wellbore) while the terms "lateral" and "laterally" refer to the radial direction orthogonal to a vertical direction.

In general, one or more embodiments of the disclosure are directed towards a device for logging downhole measurements of angular velocity, radial coordinates, real-time depth level, and inclination of a slickline. The device includes a position measurement sensor and a processor consisting of a coordinate measurement unit, an inclination measurement unit, a depth measurement unit, and a data storage unit.

Figure 1:
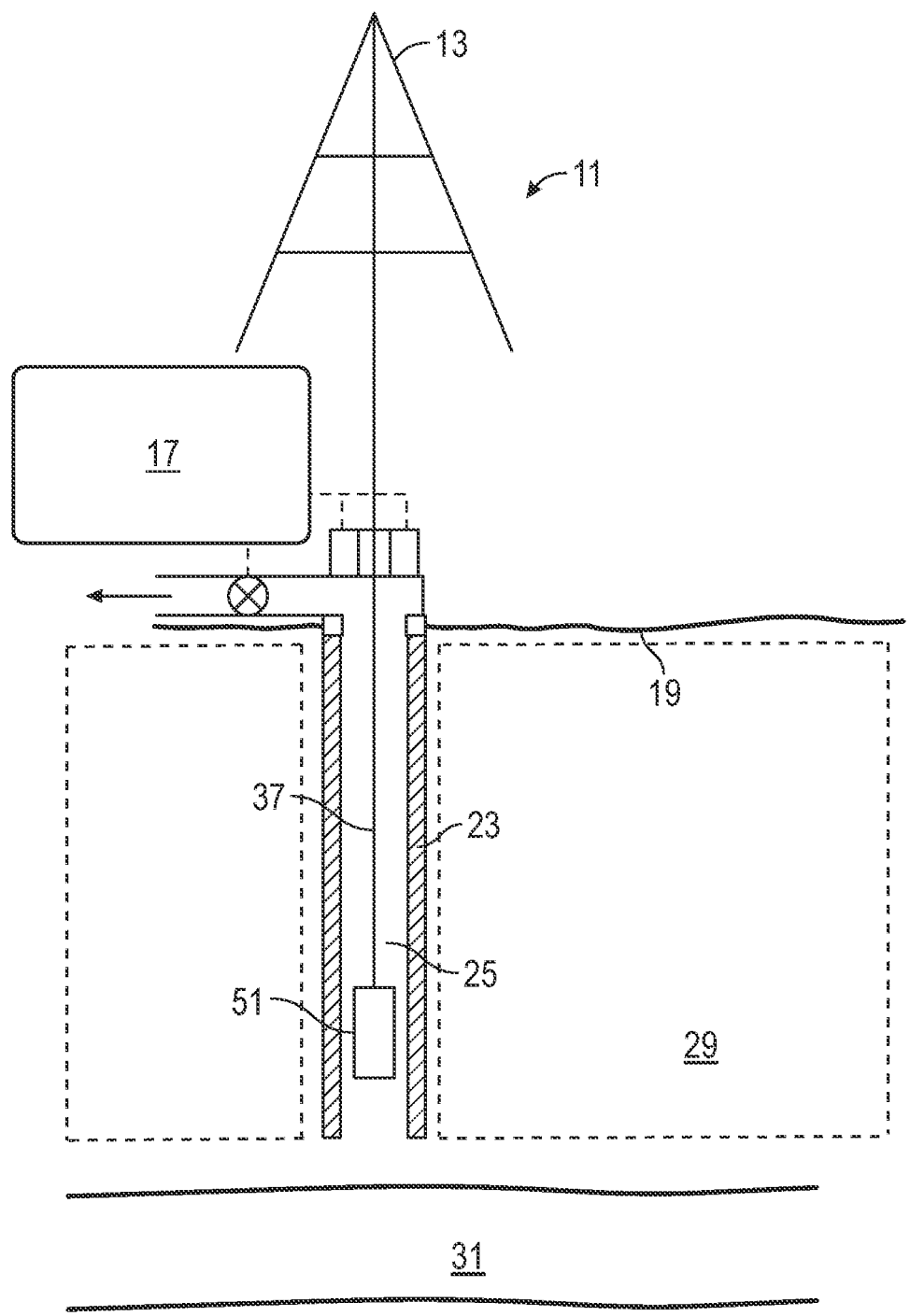
FIG. 1 depicts a well site in accordance with one or more embodiments of the invention.

FIG. 1 shows a schematic diagram illustrating an example of a well site 11. In general, well sites are configured in a myriad of ways. Therefore, the well site 11 is not intended to limit the particular configuration of the intervention equipment. For example, the well site 11 is depicted as being on land, however the well site 11 can be offshore and intervention may be carried out with or without the use of a marine riser. Moreover, various components and details of the well site 11 that would be well known to a person of ordinary skill in the art have been omitted for the sake of brevity.

An intervention operation at the well site 11 is initiated by drilling a wellbore 25, or borehole, into a subterranean formation 29. The subterranean formation 29 may include a porous or fractured rock formation that resides underground, beneath the Earth's surface ("surface") 19. The surface 19 of the well site 11 is a reference position for where the wellbore 25 originates, and the wellbore 25 extends in an axial direction from the surface 19. For the purpose of drilling the wellbore 25 into the subterranean formation 29, equipment of a drilling rig 13, such as a crown block and derrick (not shown), suspends and rotates a drill string (not shown) to break the subterranean formation 29 and create the wellbore 25. Once the wellbore 25 has been drilled and the completion tubing 23 is installed, downhole operations can commence to acquire oil and gas from the reservoir 31 in the wellbore 25. The completion tubing 23 may be formed of one or more varieties of steel (such as martensitic steel, duplex steel, or a steel alloy). After the wellbore has been created, the slickline 37 replaces the drill string (not shown) and a series of slickline tools 51 are connected and attached to the slickline 37 to perform downhole operations such as maintenance or collecting measurements.

The drill string (not shown) includes a Bottom Hole Assembly (BHA) (not shown). The BHA (not shown) is a subassembly of a drilling rig 13 that includes components such as stabilizers, reaming tools, and drill collars (not shown) that aid in breaking down the subterranean formation 29 and maintaining the orientation of the drill string (not shown) as a whole. As discussed below, the sensor assembly (e.g., FIG. 2) is disposed on a series of slickline tools 51 that also facilitate the orientation of the slickline 37 relative to the wellbore 25.

The well site 11 includes a well control system 17. The well control system 17 controls various operations of the well site 11, such as well production operations, well completion operations, well maintenance operations, and reservoir monitoring, assessment and development operations. For example, the well control system 17 controls components of the drilling rig 13 to raise and lower the slickline tools 51 during various downhole operations.

Figure 2:
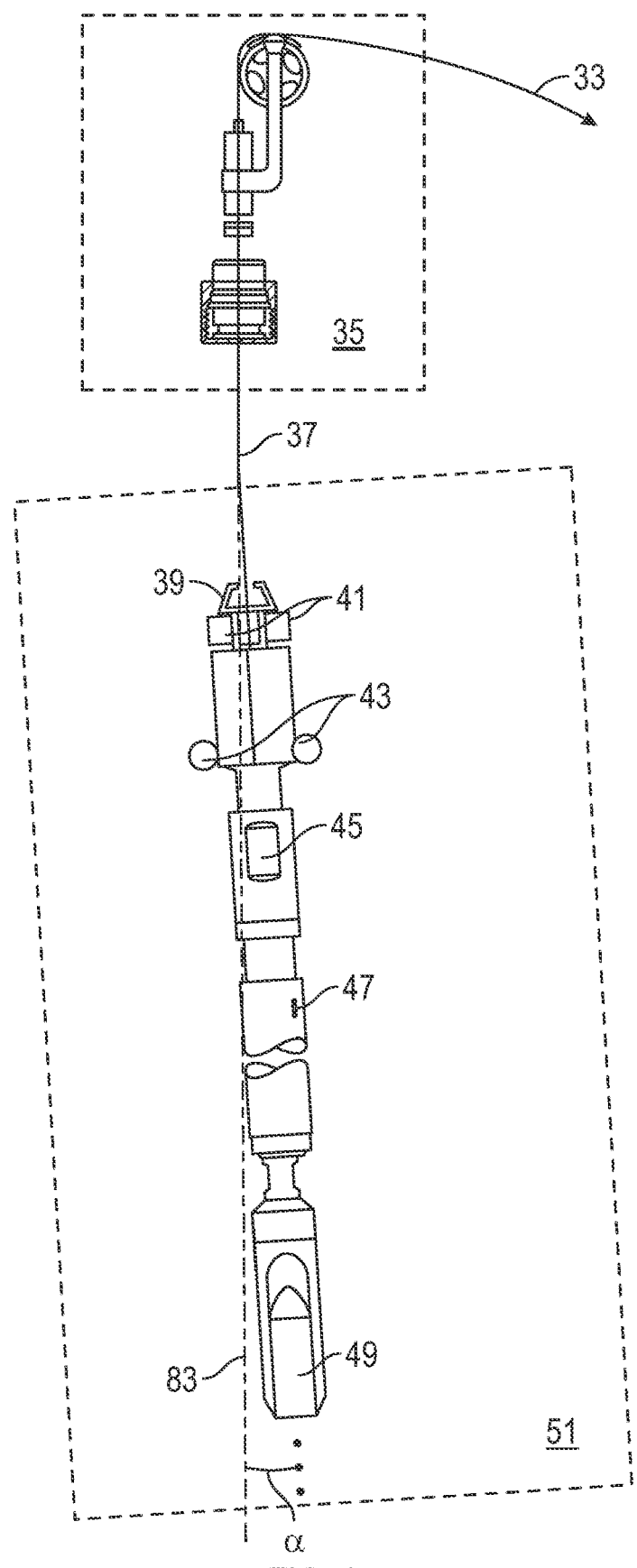
FIG. 2 depicts a slickline in accordance with one or more embodiments of the invention.

Turning to FIG. 2, FIG. 2 depicts details of the slickline tools 51 that are connected to and suspended from the stuffing box 35 via the slickline 37 and controlled by the pulling force 33. A stuffing box 35 is an assembly used to seal a rotating or reciprocating shaft against fluid leakage, such as water or steam. Returning to FIG. 1, the stuffing box 35 is disposed at the surface 19 as part of the drilling rig 13 where the pulling force 33 is applied as controlled by the well control system 17.

Further shown in FIG. 2, the slickline tools 51 include the rope socket 45 that is an assembly allowed to twist as the slickline 37 is loaded or pulled. The rope socket 45 is used to securely attach the slickline tools 51 to the slickline 37 and aids in stabilizing the rest of the slickline tools 51, such as stems 47, mechanical jars 49, or various swab tools connected below (not shown). The slickline tools 51 are threaded together, connecting to the rope socket 45, fixing the slickline tools 51 to the slickline 37.

The sensor assembly 41 and pressure gauge 43 are attached to the slickline tools 51 such that they are disposed surrounding the fishneck 39. However, the sensor assembly 41 and pressure gauge 43 are not limited to only the positions shown in the embodiment of the slickline tools 51. For example, the sensor assembly 41 and the pressure gauge 43 may be disposed surrounding the mechanical jars 49 to capture the angular velocity of a downhole end of the slickline tools 51. The sensor assembly 41 is fixed to the slickline tools 51 by welding, brazing, or otherwise adhering the casing 53 surrounding the fishneck 39. Similarly, the pressure gauge 43 is fixed to the slickline tools 51 via welding, brazing, or using similar adhesive means.

Alternatively, the location of the sensor assembly 41 and pressure gauge 43 on the slickline 37 may also be determined at the discretion of the operator or manufacturer. The sensor assembly 41 is further placed at a predetermined distance from the pressure gauge 43 at the discretion of the operator or manufacturer, where the predetermined distance serves to prevent the pressure gauge 43 from influencing the measurements captured by the sensor assembly 41.

The pressure gauge 43 measures the downhole pressure in correlation with the sensor assembly 41 to obtain associated measurements. The embodiment of FIG. 2 is not limited to only containing a pressure gauge 43 and sensor assembly 41, and may include various gauges and sensors such as temperature sensors and gamma ray sensors. In addition, the pressure gauge 43 may be embodied, for example, as a strain gauge with a diaphragm that mechanically actuates corresponding to the downhole pressure of the wellbore. Alternatively, the pressure gauge 43 may be embodied as a venturi gauge that determines a pressure differential of the wellbore based upon changes in the downhole pressure at various locations of the slickline 37 relative to the wellbore 25.

The sensor assembly 41 is further described below in relation to FIG. 4, and includes a position measurement sensor (e.g., FIG. 4) that measures an angular velocity of the slickline 37. The sensor assembly 41 may comprise a gyroscope or angle encoder, for example, and further includes a series of measurement units that determine the position of the slickline 37 based upon its angular velocity.

The series of measurement units comprises, for example, an inclination measurement unit (e.g., FIG. 4) to determine the inclination of the position measurement sensor (e.g., FIG. 3), a coordinate measurement unit (e.g., FIG. 4) to determine the radial coordinates of the position measurement sensor (e.g., FIG. 3), and a depth measurement unit (e.g., FIG. 4) to determine the real-time depth level of the position measurement sensor (e.g., FIG. 3) based on angular velocity. The inclination is determined as a function of the radial displacement of the slickline 37 in the wellbore 25, which is denoted in FIG. 2 as the angle "α."

In addition, the sensor assembly 41 further comprises a data storage unit (e.g., FIG. 3) to store the measured and determined values mentioned above on a memory (e.g., FIG. 3), which may be embodied, for example, as a non-transient storage medium. The position measurement sensor (e.g., FIG. 3) is powered by a battery (e.g., FIG. 3) that may be formed of lithium, silver oxide, alkaline, equivalent chemicals and/or compounds, and/or a combination or derivatives thereof. The sensor assembly 41 is protected by a casing (e.g., FIG. 3) which may be formed of tempered steel, iron, an alloy, derivatives thereof, or an equivalent material known to a person of ordinary skill in the art in order to operate in high-temperature environments. The casing (e.g., FIG. 3) surrounds the outside of the sensor assembly 41, and allows the sensor assembly 41 to be attached to the slickline 37 as described above.

Figure 3:
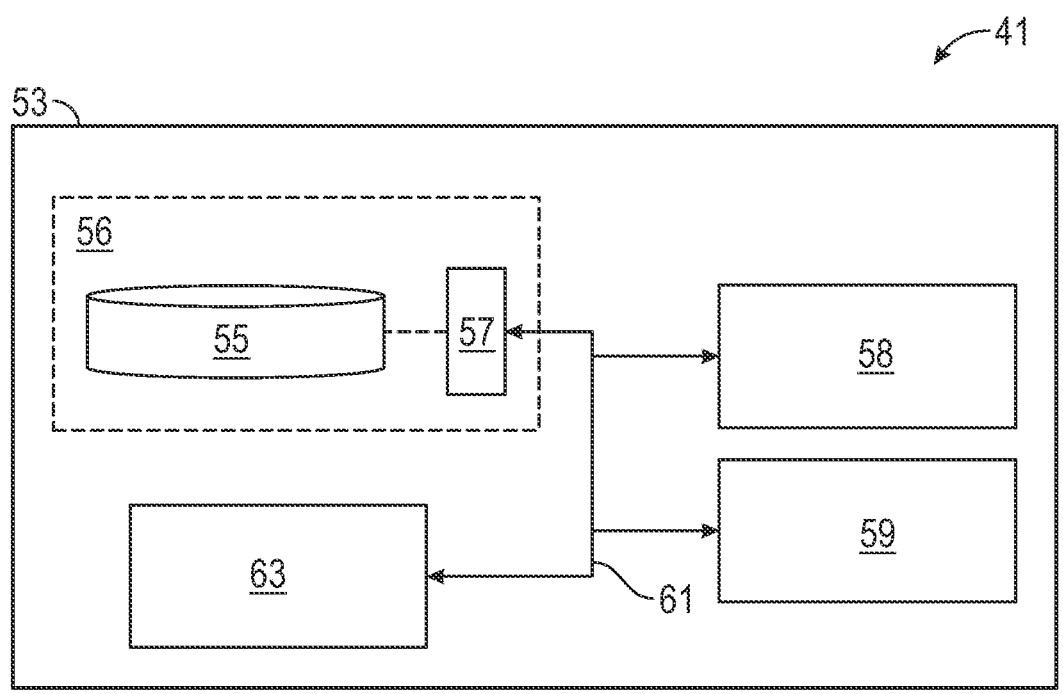
FIG. 3 depicts a schematic diagram of a sensor assembly in accordance with one or more embodiments of the invention.

Turning to FIG. 3, FIG. 3 depicts one embodiment of a sensor assembly 41 consistent with one or more embodiments of the invention discussed herein. The sensor assembly 41 comprises a position measurement sensor 63, a processor 59, a data storage unit 56 comprising a USB interface 57, a memory 55 comprising a non-transient storage medium, a battery 58, and a bus 61 that transfers the plurality of measurements to the data storage unit 56.

As described herein, the processor 59 may be embodied as one or more processors, microprocessors, logic units, controllers, and/or integrated circuits that receive, process, and transmit signals, programs, and/or operating instructions directed towards capturing the position of the slickline 37 in the wellbore 25. The processor 59 further comprises a series of measurement units (e.g., FIG. 4) that determine the real-time depth level, the inclination, and the radial coordinates of the sensor assembly 41 based on the angular velocity measured by the position measurement sensor 63. The bus 61 is a data bus formed of hardware such as wire, optical fiber, pins, and sockets that connect to each of the USB interface 57, the memory 55, the processor 59, and the position measurement sensor 63. The aforementioned components are encased in a casing 53 which may be formed of tempered steel, iron, an alloy, derivatives thereof, or an equivalent material known to a person of ordinary skill in the art. The memory 55 is connected to the USB interface 57, which is a cable/device connection port connected to the bus 61 that allows the memory 55 to be removed from the sensor assembly 41 such that the stored data can be retrieved by the operator.

The position measurement sensor 63, which comprises a micro-electro-mechanical system (MEMS) gyroscope, for example, typically measures the angular velocity with a vibratory process. The angular velocity is measured using a vibrating structure as a sensing element for detecting the angular velocity. Utilizing a phenomenon known as the Coriolis effect, which is an inertial force that causes an object to exert a force on its support when rotated, the angular velocity can be determined by measuring the exerted force from the object on the support. Alternatively, the position measurement sensor 63 may be embodied as an angle encoder that senses the relative speed of the slickline 37 as the slickline 37 actuates on an angled path to an inclined position.

Figure 4:
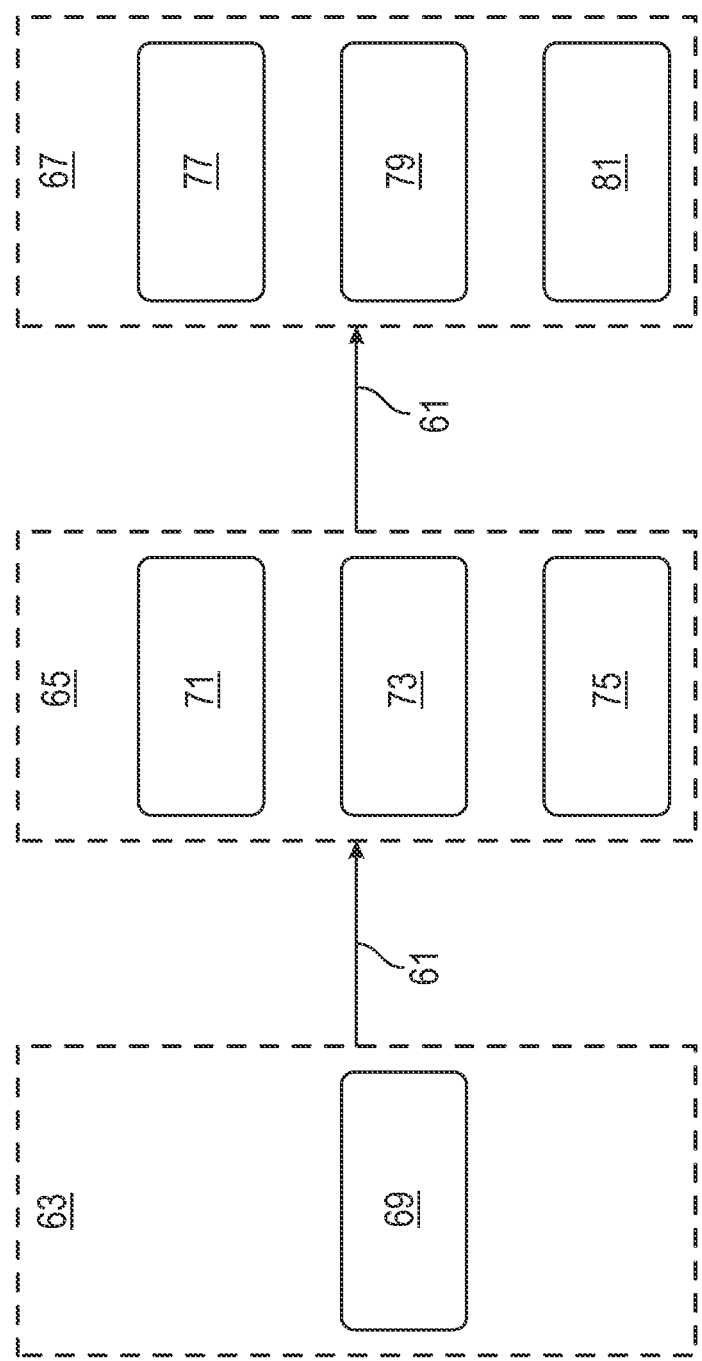
FIG. 4 depicts a schematic diagram of a processor system in accordance with one or more embodiments of the invention.

FIG. 4 depicts a diagram of a process for capturing outputs 67 of a sensor assembly 41 according to one or more embodiments of the invention as described herein. While downhole, the position measurement sensor 63 measures the angular velocity as two components, a lateral velocity component and a vertical velocity component. The lateral velocity component and the vertical velocity component are then sent via the bus 61 to the measurement units 65, which determines radial coordinates 77, an inclination 81, and a real-time depth level 79, respectively, of the sensor assembly 41 using a plurality of measurement units 65. Once gathered, the measurements are sent via the bus 61 to the data storage unit 56 which houses a memory 55 comprising a non-transient storage medium. The process for determining the radial coordinates 77, the inclination 81, and the real-time depth level 79 is further discussed below.

The coordinate measurement unit 71 determines the radial coordinates 77 from the lateral component of the angular velocity 69 measured by the position measurement sensor 63. The radial coordinates 77 define a location of the position measurement sensor 63 in the wellbore 25 for a radial direction orthogonal to the axial direction, which is the extension direction of the wellbore 25. The coordinate measurement unit 71 performs algebraic processes to convert the lateral velocity to a radial coordinate, which may, for example, involve multiplying the lateral component of the angular velocity by a time to run the slickline 37 downhole such that the radial coordinates 77 reflect the radial (or lateral) distance from the center of the wellbore 25 to the sensor assembly 41. Thus, the lateral component of the angular velocity 69 corresponds to the radial position of the slickline 37, and further corresponds to the distance created by the angle α depicted in FIG. 2.

Similarly, the depth measurement unit 73 determines the real-time depth level 79 from the vertical component of the angular velocity 69 measured by the position measurement sensor 63. The real-time depth level 79 defines a location of the position measurement sensor 63 in the wellbore 25 for an axial direction, which is the extension direction of the wellbore 25. To determine the real-time depth level 79, the depth measurement unit 73 performs algebraic processes to convert the angular velocity to a depth measurement. The algebraic processes may, for example, involve multiplying the vertical component of the angular velocity by a time to run the slickline 37 downhole such that the real-time depth level 79 reflects the vertical (or axial) distance from the surface 19 to the sensor assembly 41 in a direction orthogonal to the surface 19 of the well site 11.

Finally, the inclination measurement unit 75 determines the inclination 81 by computing a ratio of the lateral component and vertical component of the angular velocity 69 measured by the position measurement sensor 63. The inclination defines an angle of tilt with reference to a direction orthogonal to the surface 19 of the well site 11 as the sensor assembly 41 is lowered through the wellbore 25. Such an inclination is reflected in a physical sense by the angle α depicted in FIG. 2.

Once the radial coordinates 77, the inclination 81, and the real-time depth level 79 have been computed by the measurement units 65, the process is completed by returning the slickline 37 to the surface 19 and receiving the measurements. This is facilitated by the memory 55 and the USB interface 57 as described above, where the USB interface 57 allows the memory 55 to be removed from the sensor assembly 41 by pulling the memory 55 out of the USB interface 57. The measurements collected by the sensor assembly 41 may be further used by an operator to reconstruct the orientation of the wellbore, or to verify that the drill string (not shown) was oriented correctly while performing the intervention operation.

Figure 5:
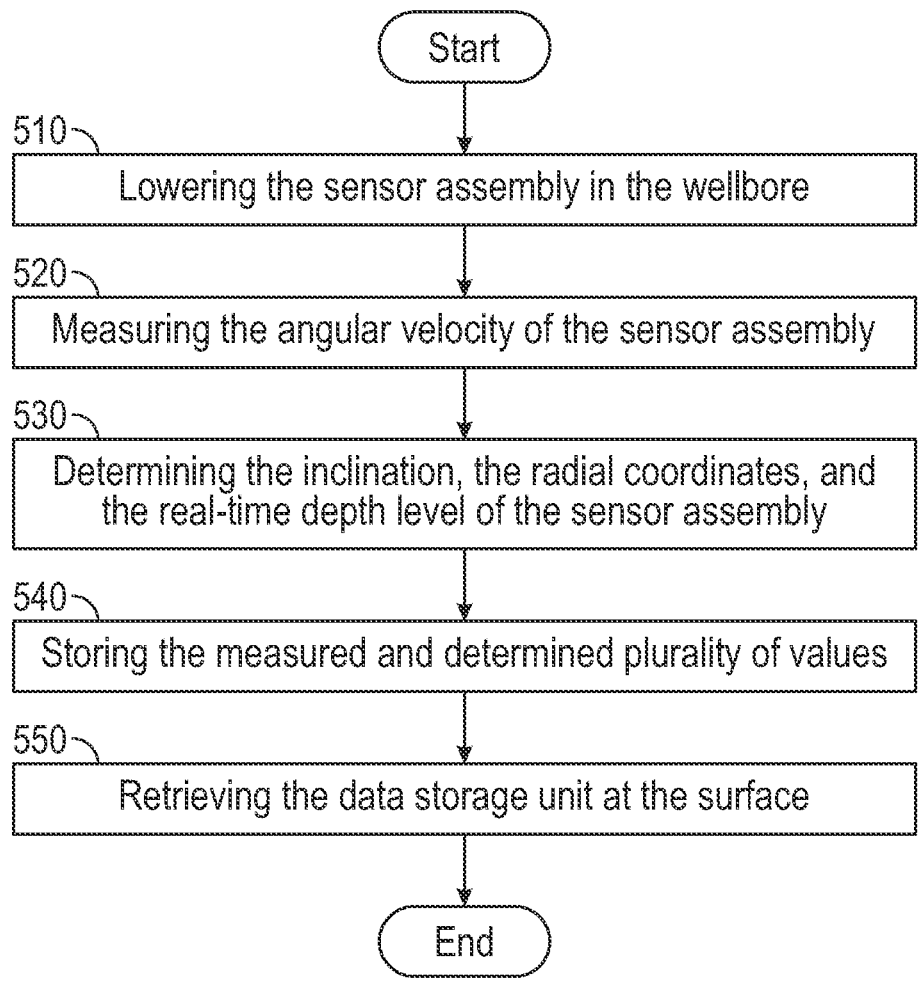
FIG. 5 depicts a flowchart of a method in accordance with one or more embodiments of the present disclosure.

FIG. 5 depicts a method for acquiring a plurality of downhole measurements in accordance with one or more embodiments of the invention. While the various blocks in FIG. 5 are presented and described sequentially, one of ordinary skill in the art will appreciate that some or all of the blocks may be executed in a different order, may be combined or omitted, and some or all of the blocks may be executed in parallel and/or iteratively. Furthermore, the blocks may be performed actively or passively.

Initially, in Step 510, the slickline 37 is lowered from the surface 19 of the well site 11 into the wellbore 25. The slickline tools 51 are attached to the slickline 37 and the sensor assembly 41 and pressure gauge 43 are attached to the slickline tools 51 at locations determined at the discretion of the operator. As the slickline 37 and sensor assembly 41 are lowered into the wellbore 25, the method proceeds to Step 520, where the sensor assembly 41 is activated.

During Step 520, the position measurement sensor 63 inside the sensor assembly 41 measures the angular velocity of the sensor assembly 41 in time intervals at the discretion of the operator or manufacturer. Alternatively, a connection, wired or wireless, to the position measurement sensor 63 can be established such that the operator can decide to manually collect data at their discretion rather than with predetermined timed intervals. Such a connection may be facilitated by a Wi-Fi, Bluetooth, Zigbee, or similar connection between the sensor assembly 41 and the well site 11, for example.

In Step 530, the angular velocity measurements are used to interpret the inclination, radial coordinates, and real-time depth level of the sensor assembly 41 via a processor comprising the inclination measurement unit 75, the coordinate measurement unit 71, and the depth measurement unit 73, respectively. The aforementioned measurement units may be embodied, for example, as software interpreted by the processor 59 that extracts the inclination, radial coordinates, and real-time depth level from the vertical and lateral components of the angular velocity as described above.

In Step 540, the plurality of measured values comprising of the angular velocity, the inclination, the radial coordinates, and the real-time depth level of the sensor assembly 41 are stored on the memory 55 of the data storage unit 56. As discussed above, the memory 55 comprises a non-transient storage medium such as RAM, FeRAM, MRAM, or equivalent storage mediums. The memory 55 receives the data via a USB interface 57, which is a cable or device connection port. The USB interface 57 is not necessarily limited to Universal Serial Bus (USB), and may instead comprise Ethernet, Thunderbolt, or Fire Wire.

In step 550, the slickline 37 is raised through the wellbore 25 to the surface 19. There, the measurements stored on the data storage unit 56 are retrieved by an operator. The memory 55 can be disconnected from the data storage unit 56 by the USB interface 57 such that the entire sensor assembly 41 does not have to be disconnected from the slickline tools 51. Alternatively, the slickline 37 may employ a wireless data connection (not shown) that replaces the functionality of the data storage unit 56 by transmitting the measurements to the well site 11 in real time. Once the measurements are received by an operator, the operator may use the measurements to determine the travel path of the slickline 37 through the wellbore 25 as described above.

Accordingly, the aforementioned embodiments of the invention as disclosed relate to devices and methods useful in reducing inaccuracies in downhole measurements. In addition, embodiments of the invention are capable of overcoming inaccuracies in slickline depth measurements to tension related expansion of the slickline, thereby eliminating the need for interpolation when determining an inclination of a slickline. Embodiments of the invention also receive the benefit of being capable of adding additional sensors and gauges not previously mentioned to acquire any number of measurements at the discretion of the operator, thus providing more accurate data for downhole operations.

Although only a few example embodiments have been described in detail above, those skilled in the art will readily appreciate that many modifications are possible in the example embodiments without materially departing from this invention, for example, the sensor assembly could be attached to a drill string during drilling operations to provide useful feedback to the operator, such as the inclination of the drill string. Accordingly, all such modifications are intended to be included within the scope of this disclosure as defined in the following claims. In the claims, means-plus-function clauses are intended to cover the structures described herein as performing the recited function and not only structural equivalents, but also equivalent structures. Thus, although a nail and a screw may not be structural equivalents in that a nail employs a cylindrical surface to secure wooden parts together, whereas a screw employs a helical surface, in the environment of fastening wooden parts, a nail and a screw may be equivalent structures. It is the express intention of the applicant not to invoke 35 U.S.C. § 112(f) for any limitations of any of the claims herein, except for those in which the claim expressly uses the words 'means for' together with an associated function.

What is claimed is:

1. A sensor assembly comprising:
   a position measurement sensor configured to measure an angular velocity of the sensor assembly inside a wellbore that extends in an axial direction;
   a slickline configured to raise and lower the position measurement sensor in the wellbore;
   a processor configured to execute a series of measurement units, the series of measurement units comprising:
      an inclination measurement unit configured to determine, based upon the angular velocity measured by the position measurement sensor, an inclination of the position measurement sensor inside the wellbore;
      a coordinate measurement unit configured to determine, based upon the angular velocity measured by the position measurement sensor, radial coordinates of the sensor assembly inside the wellbore, the radial coordinates defining a location of the position measurement sensor in the wellbore for a radial direction orthogonal to the axial direction;
      a depth measurement unit configured to determine, based upon the angular velocity measured by the position measurement sensor, a real-time depth level of the sensor assembly inside the wellbore, and
   a data storage unit configured to store a plurality of values, the plurality of values comprising the angular velocity, the inclination, the radial coordinates, and the real-time depth level of the position measurement sensor.

2. The sensor assembly of claim 1, wherein a reference position for the position measurement sensor is a surface where the wellbore originates.

3. The sensor assembly of claim 1, further comprising: a battery configured to provide power to the position measurement sensor.

4. The sensor assembly of claim 3, wherein the battery is disposed on a slickline tool.

5. The sensor assembly of claim 1, wherein the sensor is placed at a predetermined distance from a pressure gauge configured to measure a downhole pressure of the wellbore.

6. The sensor assembly of claim 1, wherein the data storage unit is configured to be detached from the sensor assembly to receive the plurality of values.

7. The sensor assembly of claim 1, wherein the sensor assembly further comprises a casing formed of tempered steel, which is configured to operate in high-temperature environments.

8. The sensor assembly of claim 1, wherein the position measurement sensor is disposed surrounding a fishneck attached to the slickline.

9. The sensor assembly of claim 1, wherein the position measurement sensor comprises a gyroscope.

10. The sensor assembly of claim 1, wherein the series of measurement units are stored on a memory comprising a non-transient storage medium.

11. A method to perform a plurality of measurements in a wellbore, the method comprising:
   measuring, via a position measurement sensor, an angular velocity of a sensor assembly extending inside the wellbore in an axial direction;
   raising and lowering, via a slickline, the position measurement sensor in the wellbore;
   executing, via a processor, a series of measurement units, the series of measurement units comprising:
      determining, via an inclination measurement unit based upon the angular velocity measured by the position measurement sensor, an inclination of the position measurement sensor inside the wellbore;
      determining, via a coordinate measurement unit based upon the angular velocity measured by the position measurement sensor, radial coordinates of the sensor assembly inside the wellbore, the radial coordinates defining a location of the position measurement sensor in the wellbore for a radial direction orthogonal to the axial direction;
      determining, via a depth measurement unit configured to determine based upon the angular velocity measured by the position measurement sensor, a real-time depth level of the sensor assembly inside the wellbore, and
      storing, via a data storage unit, a plurality of values, the plurality of values comprising the angular velocity, the inclination, the radial coordinates, and the real-time depth level of the position measurement sensor.

12. The method of claim 11, further comprising: establishing a reference position for the position measurement sensor is a surface where the wellbore originates.

13. The method of claim 11, further comprising: providing power, via a battery, to the position measurement sensor.

14. The method of claim 13, further comprising: disposing the battery on a slickline tool.

15. The method of claim 11, further comprising: placing the sensor at a predetermined distance from a pressure gauge configured to measure a downhole pressure of the wellbore.

16. The method of claim 11, further comprising: detaching the data storage unit from the sensor assembly and receiving the plurality of values.

17. The method of claim 11, further comprising: protecting the sensor assembly in a casing formed of tempered steel, configured to operate in high-temperature environments.

18. The method of claim 11, further comprising: disposing the position measurement sensor surrounding a fishneck attached to the slickline.

19. The method of claim 11, wherein the position measurement sensor comprises a gyroscope.

20. The method of claim 11, further comprising: storing the series of measurement units on a memory comprising a non-transient storage medium.

* * * * *